March 15, 1960 G. B. HERZOG 2,928,955

PHASE COMPARISON CIRCUITS

Filed Feb. 1, 1955 2 Sheets-Sheet 1

INVENTOR.
GERALD B. HERZOG
BY H. Newton
ATTORNEY

March 15, 1960 G. B. HERZOG 2,928,955

PHASE COMPARISON CIRCUITS

Filed Feb. 1, 1955 2 Sheets-Sheet 2

INVENTOR.
GERALD B. HERZOG
BY H. L. Newton
ATTORNEY

United States Patent Office 2,928,955
Patented Mar. 15, 1960

2,928,955

PHASE COMPARISON CIRCUITS

Gerald B. Herzog, Princeton, N.J., assignor to Radio Corporation of America, a corporation of Delaware Application February 1, 1955, Serial No. 485,566

11 Claims. (Cl. 307—88.5)

The present invention relates generally to phase comparison and phase detection circuits for comparing the phases of alternating electrical signals and for deriving therefrom control signals indicative of existing phase relationships, and relates more particularly to circuit of that type in which semiconductor devices are utilized.

In many instances, particularly in electrical signaling systems, there is a need for circuits which compare the phase of a pair of electrical waves to produce a signal indicative of the sense and magnitude of the phase difference between them. In one type of utilization of phase control apparatus, a local controllable wave is compared in phase with a standard wave, or some other electrical wave not subject to local control, and a control signal is developed which may be applied to control the generation of the local wave so as to bring it into synchronous frequency and phase relationship with the standard or externally controlled wave. Such phase comparison circuits may be used in connection with color television receivers for certain applications.

In the type of color television system which presently is in accordance with the standards proposed by the National Television Systems Committee (NTSC), the side bands of a subcarrier wave which is both phase and amplitude modulated in accordance with the color information of a subject, are interspersed with the video signals representing brightness of the subject. The frequency of the color subcarrier wave is so chosen that the color-signal-modulated side band energy components are made to fall between the brightness signal energy components.

In such systems, the color information is derived at a receiver by synchronously demodulating the color subcarrier wave. Such demodulation is effected under the control of a reference frequency oscillator operating in synchronism and in predetermined phase relation with the received phase and amplitude modulated color subcarrier wave.

For the synchronization of the receiver color subcarrier wave reference oscillator, it is the present practice to transmit a composite signal which includes, in addition to the video signals comprising the brightness and color information, the usual horizontal and vertical synchronizing signals, and also bursts of several cycles each of the color subcarrier wave frequency, respectively following the horizontal synchronizing signals.

The burst of several cycles of the color subcarrier frequency is used as a standard frequency signal for synchronizing the local reference oscillator. For proper demodulation of the color information, the phase of the local oscillator must be in agreement with the phase of the subcarrier burst, since the accuracy of agreement between these phases will determine the accuracy of the hue of the color information ultimately applied to the kinescope.

In this system, phase comparison is only possible during the periods of the aforementioned bursts. Accordingly, it is desirable to provide a phase comparison system which provides an output signal only in response to the phase difference occurring during the period of the burst.

The recent development of commercially useful semiconductor devices of the type employing a semi-conductive element having three contacting electrodes has caused the introduction of many new techniques in the electric signal communication field. These devices, known extensively as "transistors," are small in size, especially when compared with the ordinary vacuum tube, require no heater power, are very durable and consist of materials which appear to have a long useful life. Therefore, the use of transistors in phase detection apparatus as well as other circuit applications has been the subject of extensive investigation.

It is an object of the present invention to provide an improved phase comparison transistor circuit adapted for use in any signal comparison system where accuracy and sensitivity are of importance.

It is another object of the present invention to provide improved circuit means for detecting the phase difference between two applied electrical waves.

It is a further object of the present invention to provide a phase comparison circuit which may effectively utilize semi-conductor devices for indicating the magnitude and sence of a phase difference between two electrical signals.

It is a still further object of the present invention to provide an improved gated phase detector which is operative solely during a predetermined portion of a repeating electrical wave.

It is still another object of the invention to provide in a color television receiver an improved system for comparing the frequency of the local reference frequency oscillator signal with that of the received color subcarrier signal.

In accordance with the present invention, the opposite conduction characteristics of a pair of transistors of opposite conductivity types are utilized to sense the phase difference betwen an electrical wave of one frequency and another electrical wave of double that frequency. One of these signals is coupled in common to the base electrodes of the pair of transistors while the other signal is coupled in common to the emitter electrodes. Base-to-emitter current conduction will occur in one transistor at a time, depending on the instantaneous relative polarity of the signals.

If the signals are in phase, each transistor base-to-emitter path will conduct an equal portion of the period of the lower frequency wave. If there is a phase difference, one or the other of the pair of transistors will conduct more current. By connecting the collector electrode to a suitable energizing source, the collector electrodes are made to conduct in accordance with conduction in the base-to-emitter path. A net direct output voltage or current, suitable for controlling, for example, the reference frequency or local oscillator, may thereby be derived from this circuit.

The novel features that are considered characteristic of this invention are set forth with particularity in the appended claims. The invention itself, however, both as to its organization and method of operation as well as additional objects and advantages thereof, will be best understood from the following description when read in connection with the accompanying drawing, in which:

Figure 1:
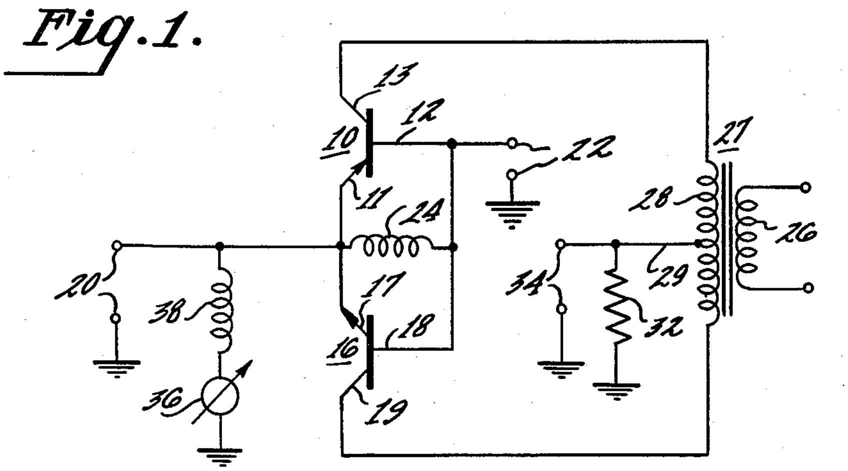
Figure 1 is a schematic circuit diagram of a phase comparison circuit embodying the invention.

Referring now to the drawings, wherein like elements are designated by like reference numerals throughout the various figures and referring particularly to Figure 1, a pair of semiconductor devices or transistors 10 and 16 are of opposite conductivity type and respectively include a pair of emitter electrodes 11 and 17 which are connected in common to one of a first pair of input terminals 20, the other of which is connected to a common circuit point or ground. One of the two sources of electrical input signals, the phase of which are to be compared may be connected to the pair of terminals 20.

The pair of transistors 10 and 16 further include respectively a pair of base electrodes 12 and 18 and a pair of collector electrodes 13 and 19. The base electrodes 12 and 18 are connected in common to one of a second pair of input terminals 22, the other of which is connected to ground. The other of the two sources of input signals may be connected to the pair of input terminals 22.

A direct current conductive impedance element which is illustrated as an inductor 24 and which, for example, be a radio frequency choke coil, is connected between the base electrodes 12 and 18 and the emitter electrodes 11 and 19, in order to provide essentially zero direct voltage bias between the base and emitter electrodes of the pair of transistors.

As hereinbefore stated, the transistors 10 and 16 are of opposite conductivity types, and for example, may be considered to be P-N-P and N-P-N junction transistors respectively. For normal transistor operation, i.e., amplification, a negative energizing voltage must be applied to the collector electrode 13 of the P-N-P transistor 10 and a positive energizing voltage must be applied to the collector electrode 19 of the N-P-N transistor 16.

Accordingly, means are provided for applying the requisite energizing potentials to the collector electrodes 13 and 19. In certain systems, as hereinbefore noted, comparison of phases of the two electrical signals applied respectively at the first and second pairs of input terminals 20 and 22 need be made solely during a predetermined portion of a repeating electrical cycle. The energizing means, in this case, may be applied only during this predetermined period. In the circuit of Figure 1, this is accomplished by applying an energizing pulse to the primary winding 26 of a transformer 27 having a balanced secondary winding 28 with a tap 29 connected to its center point. One end of the secondary winding 28 is connected to the collector electrode 13, and the other end is connected to the collector electrode 19. The pulse applied to the primary winding 26 is poled to apply operating energizing potentials to the collector electrodes as outlined above.

In a color television receiver, this pulse may be derived from the horizontal deflection circuit, in order to make the phase comparison circuit operative only during the period of the hereinbefore mentioned color burst.

In the absence of input signals applied at the two pairs of input terminals 20 and 22, very little conduction will take place in either transistor. When signals are applied, however, conduction will take place in one or the other transistor, depending upon the relative polarity of the input signals. Thus, if the input signal wave applied to the emitter electrodes 11 and 17 are instantaneously positive relative to the input signal wave applied to the base electrodes 12 and 18, the P-N-P transistor 10 will conduct, while the N-P-N transistor will be driven to a point of low collector current conduction. The reverse, of course will be true for the case in which, the input signal wave applied to the emitter electrodes 11 and 17 is negative relative to the input signal wave applied to the base electrodes 12 and 18.

In the presence of energizing potentials applied to the collector electrodes 13 and 19, therefore, an unbalance of voltage will be caused in the output circuit. A load impedance element, illustrated as a resistor 32 is connected between the tap 29 of the output transformer and ground. The unbalance voltage will appear across the resistor 32.

Output signal voltage, which for example, may be utilized to control the frequency of the local reference oscillator in a color television receiver, may be derived from a pair of output terminals 34, one of which is connected to the tap 29, and the other of which is connected to ground.

If the device to be controlled is more easily controlled by current than voltage, the output unbalance current may be utilized. To derive such an output, a utilization device 36 may be connected between ground and the emitter electrodes 11 and 17. A series inductor 38 connected in series with the utilization device 36 may be utilized to isolate the output control signal from the input signal waves.

Figure 2:
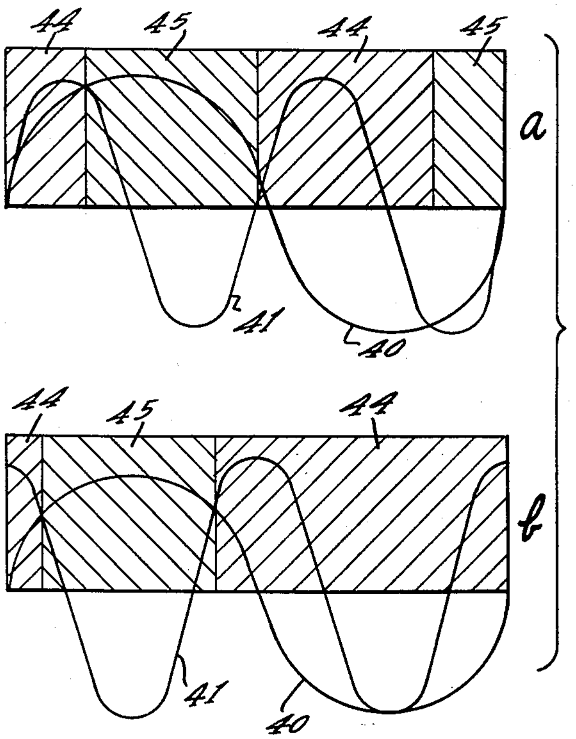
Figure 2 is a graph showing waveforms of signals applied to the circuit of Figure 1, and illustrating certain basic principles underlying the operation of the invention.

In Figure 2, to which reference is now made, the periods of conduction for the individual transistors of the circuit of Figure 1 are depicted graphically. If for example, a signal wave 40 of a certain frequency is applied to the emitter electrodes 11 and 17 of the circuit of Figure 1, to which reference is jointly made, and a signal wave 41 of double the frequency is applied to the base electrodes 12 and 18 (the two signal waves having the phase and amplitude characteristics shown in Figure 2*a*), then for a portion of the time, indicated on the diagrams of both Figures 2*a* and 2*b* by the areas 44, the curve 41 will be positive with respect to the curve 40, and the base electrodes 12 and 18 will be positive relative to the emitter electrodes 11 and 17. During the periods indicated by the areas 44, therefore, the N-P-N transistor 16 will conduct, while the P-N-P transistor will not.

During the periods indicated on both Figure 2*a* and Figure 2*b* by the areas 45, the signal wave 40 is positive relative to the signal wave 41, so that the emitter electrodes 11 and 17 become positive relative to the base electrodes 12 and 18. Hence, during the periods indicated by the areas 45, the P-N-P transistor will conduct, while the N-P-N transistor will not.

If the signal waves 40 and 41 have the phase and amplitude indicated in Figure 2*a*, the wave 40 will be positive relative to 41 for one half the time and vice-versa. Hence, the transistors 10 and 16 will conduct an equal amount on the average, so that no net output voltage will be derived.

If on the other hand, the phase and amplitude of the signal waves 40 and 41 are as depicted in Figure 2*b*, the signal wave 41 will be positive for a greater portion of the period, as may be seen by comparing the larger area 44 with the smaller area 45. Thus, the N-P-N transistor will conduct for a longer period than the P-N-P transistor, and a net output voltage will be derived from the circuit. The output voltage may be used as the control voltage for an oscillator.

Thus, depending upon the phase of the two signal waves, a variable amount of output correction voltage is derived.

Figure 3:
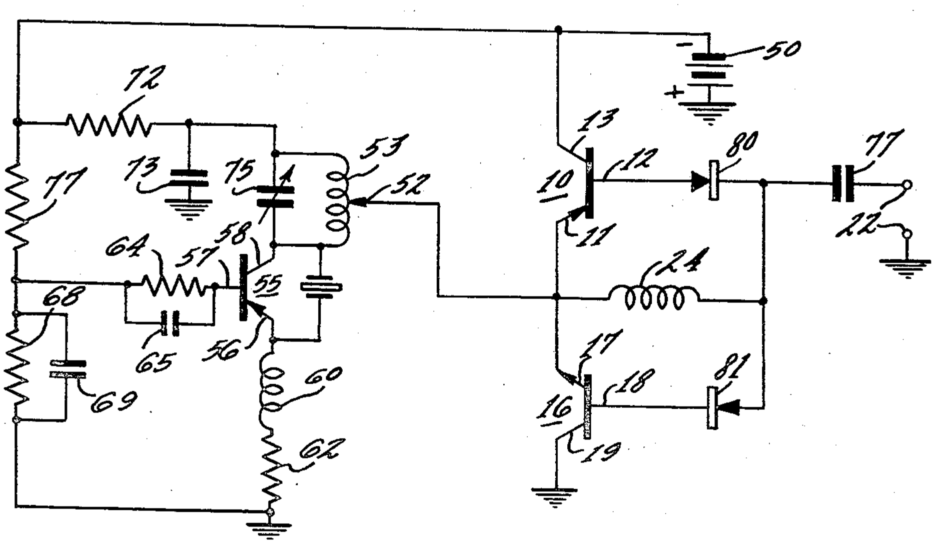
Figure 3 is a schematic circuit diagram showing a phase controlled oscillator circuit including a phase comparison circuit in accordance with the invention.

Referring now to Figure 3, a phase detector circuit in accordance with the invention is utilized to control the frequency of a crystal-controlled local reference frequency oscillator. The phase detector circuit includes a pair of transistors 10 and 16 of opposite conductivity type having their respective emitter electrodes 11 and 17 connected in common to a point in the oscillator circuit which may be a tap 52 on a tank coil 53 in the collector electrode circuit of an oscillator transistor 55, which is by way of illustration seen to be of the P-N-P type.

The oscillator transistor 55, in addition to a collector electrode 58 further includes an emitter electrode 56 which is connected to a common circuit point or ground through the series combination of an inductor 60 which may be a radio frequency choke coil and a direct current stabilizing resistor 62, and a base electrode 57 which is connected to ground through the series combination of a bias network consisting of a resistor 64 and a capacitor 65 connected in parallel, and a resistor 68 and a bypass capacitor 69 also connected in parallel.

Operating potential is applied to the collector electrode 58 from the negative terminal of a source of energizing potential illustrated as a battery 50 through the series combination of a decoupling resistor 72 and the tank coil 53. The positive terminal of the battery 50 is connected to ground. A filter or decoupling capacitor 73 is connected between the junction of the decoupling resistor 72 and ground. The tank coil 53 is tuned by a tuning capacitor 75 connected in parallel therewith. Bias current is supplied to the base electrode by a bias resistor 77 connected between the negative terminal of the battery 50 and the junction of the resistor 64 and the resistor 68.

Crystal control of the frequency of the oscillator circuit is achieved by connecting a piezoelectric crystal between the collector electrode 58 and the emitter electrode 56. It is noted that the base electrode circuit is coupled to ground at the oscillator signal frequency through the series combination of the capacitor 65 and the capacitor 69.

The P-N-P transistor 10 has its collector electrode 13 connected to the negative terminal of the battery 50, while the collector electrode 19 of the N-P-N transistor 16 is connected to ground, thereby providing a series path for energizing current flow through the transistors 10 and 16.

A signal with which the oscillator is to be synchronized, derived from any convenient source of signals is applied at a pair of input terminals 22, one of which is connected to ground and the other of which is coupled to the base electrodes 12 and 18 through a coupling capacitor 77 connected between the ungrounded one of the pair of input terminals and the junction of a pair of diodes 80 and 81, which are connected in series in the order named between the base electrode 12 and the base electrode 18.

The function of the diodes 80 and 81 is to prevent leakage of the signal through the base-to-emitter capacity of the transistors. Many transistors will be found to have low enough capacity not to require these diodes. An inductor 24, connected between the junction of the diodes and the emitter electrodes 11 and 17, is utilized to maintain low direct voltage between the base and emitter electrodes.

In operation, the phase of the signal generated by the oscillator transistor 55 may either lag or lead the phase of the signal applied to the pairs of input terminals 22. Accordingly, as described with reference to the curves of Figure 2 and the circuit of Figure 1, one or the other of the transistors 10 and 16 will conduct, causing a direct component of current to be added to or subtracted from the energizing current supplied to the collector electrode 58 of the oscillator transistor 55. The current flowing in the resistor 72 will therefore change, so that the direct voltage on the collector will also change, thereby to correct the oscillator frequency or phase.

The circuit of Figure 3 may obviously be adapted to use of collector electrode gating action, as in the case of Figure 1, if such gating is necessary.

Figure 4:
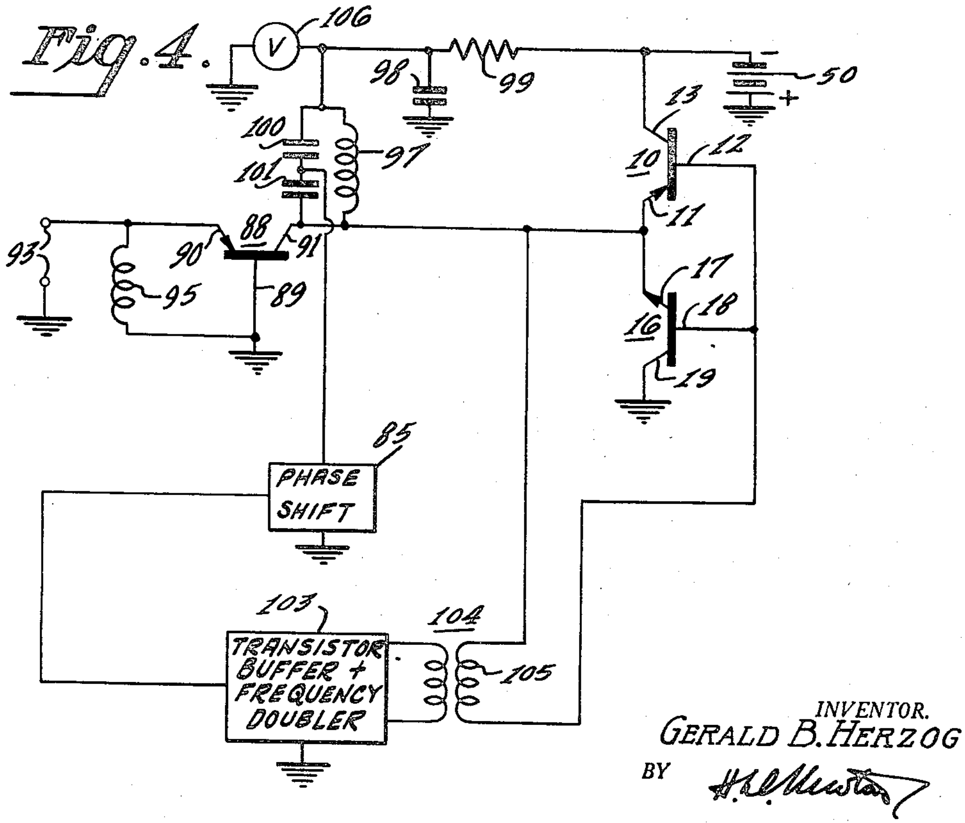
Figure 4 is a schematic circuit diagram of phase detector showing a further embodiment of the invention.

In Figure 4, to which reference is now made, a phase comparison circuit in accordance with the invention is utilized to detect and indicate electrically the phase shift in an electrical element illustrated by the block 85.

In the system of Figure 4, an amplifier transistor 88 includes a base electrode 89 which is connected to ground and an emitter electrode 90 which is connected to one of a pair of input terminals 93, the other of which is connected to ground. An inductor 95 is connected between the emitter electrode 90 and ground in order to maintain low direct voltage therebetween. The transistor 88 further includes a collector electrode 91 which is connected through the series combination of a tank coil 97 and a load resistor 99 to a battery 50. A bypass capacitor 98, connected between ground and the junction of the tank coil 97 and the load resistor 99, bypasses signal current, to ground. The tank coil is tuned by a pair of capacitors 100 and 101 connected in series thereacross.

Signals applied from any convenient source of signals to the pair of input terminals 93 and coupled to the emitter electrode 90 are amplified by the transistor 88 and appear at the collector electrode 91. A portion of this signal is applied from the junction of the pair of capacitors 100 and 101 to the phase shift element 85 shown in block form. The signal from the element 85, shifted in phase, is then applied to a buffer amplifier and frequency doubler. A double frequency output signal then appears at the transformer 104, regulated in phase by the amount of phase shift in the element 85.

The transformer 104 includes a secondary winding 105 which is connected directly from the base electrodes 12 and 18 in common to the emitter electrodes 11 and 17 also connected in common of the transistors 10 and 16, respectively. Accordingly, the conduction of the transistors 10 and 16 in the circuit of Figure 4 is controlled by the voltage applied directly between the base and emitter electrodes from the secondary winding 105.

The emitter electrodes 11 and 17 are coupled in common to the collector electrode 91, so that signal voltages on the collector electrode are impressed upon the emitter electrodes 11 and 17.

The phase of the signal at the collector electrode 91 relative to that of the signal applied between the base and emitter electrodes from the secondary winding 105 will determine the amount of conduction in the transistors 10 and 16, although the conduction time is controlled by the last-named signal. The relative amount of conduction will determine the voltage drop in the resistor 99, thereby to cause a direct voltage to appear at the collector electrode 91, and also at the junction of the tank coil 97 and the resistor 99.

A utilization device, illustrated as a direct voltage indicating means may be connected to either of these points to derive a direct control signal dependent upon the phase shift provided by the phase shift device 85.

It should be noted that in the case of Figure 1, to which reference is now jointly made, the two signals to be compared are applied respectively between the base electrodes and ground and the emitter electrodes and ground. In the circuit of Figure 4, on the other hand, one signal is applied between the emitter electrodes and ground while the other signal is applied between the base and emitter electrodes.

The circuit of Figure 4, was tested and was found to give a variation in voltage across the utilization device 106 of more than five volts utilizing a battery 50 of 22½ volts, as the phase shift in the element 85 was varied from an in phase to an out of phase condition.

The phase comparison circuit of Figure 4 may be used in applications of the type described with reference to Figure 3 by applying a separate reference signal to the buffer and frequency doubler circuit 103. The emitter electrodes 11 and 17 would then, of course, be connected in circuit with an oscillator rather than an amplifier, and the oscillator frequency would be brought into synchronism with the reference signal.

Phase comparison circuits, in accordance with the present invention provide a reliable and sensitive indication of both the magnitude and sense of a phase difference between a pair of electrical signals. The output signal may conveniently represent phase comparisons made solely during a predetermined portion of a repeating electrical cycle by application of the gating principles discussed in relation to one embodiment of the invention. Semiconductor devices of two conductivity types are thus utilized effectively to provide accurate and reliable phase comparison and detection.

What is claimed is:

1. In a system for detecting the phase difference between two signals evenly harmonically related in frequency, the combination comprising, a pair of semiconductor devices of opposite conductivity types, each of said devices including a first input electrode, a second input electrode and a further electrode, first input circuit means connected for applying one of said signals to said first input electrodes, second input circuit means connected for applying the other of said signals to said second input electrodes, means connected with said further electrodes providing energizing current for said devices, and output circuit means coupled with said transistors in parallel relation.

2. In a system for detecting the phase difference between two signals, the combination comprising, a pair of transistors of opposite conductivity types, each of said devices including a base electrode, an emitter electrode and a collector electrode, first input circuit means connected for applying one of said signals at a predetermined frequency to said base electrodes, second input circuit means connected for applying the other of said signals at an even harmonic frequency of said predetermined frequency to said emitter electrodes, means connected with said collector electrodes providing energizing current for said devices, and means coupled with said transistors in parallel relation for deriving therefrom a control signal in response to the phase differential between said two signals.

3. A system for detecting the phase relationship between alternating signals from a first signal source and alternating signals from a second signal source comprising the combination of a pair of semiconductor devices of opposite conductivity types each having base, emitter and collector electrodes, said emitter electrodes being coupled with said first source, said base electrodes being coupled with said second source, said second source providing signals of double the frequency of signals from said first source, energizing means coupled with said collector electrodes, and output circuit means coupled with said system for deriving a control signal in response to the difference in phase between the signal from said first signal source and the signal from said second signal source.

4. In a system for detecting the phase difference between two signals, the combination comprising, a pair of semiconductor devices of opposite conductivity types, each of said devices including a first input electrode, a second input electrode and a further electrode, first input circuit means connected for applying one of said signals of one frequency to said first input electrodes, second input circuit means connected for applying the other of said signals at an even harmonic of the first to said second input electrodes, a direct current conductive impedance element connected between said first and said second input electrodes, means connected with said further electrodes providing energizing current for said devices, and means coupled with said devices in parallel relation for deriving therefrom a control signal in response to the phase differential between said two signals.

5. In a system for detecting the phase difference between two related signals, the combination comprising, a pair of semiconductor devices of opposite conductivity types, each of said devices including a base electrode, an emitter electrode and a collector electrode, first input circuit means including a pair of unilaterally conducting devices connected for applying one signal to said base electrodes, second input circuit means connected for applying a second related signal to said emitter electrodes, said signals being evenly harmonically related in frequency, inductor means connected between said base and emitter electrodes providing a relatively low resistance direct current path therebetween, means connected with said collector electrodes providing energizing current for said devices, and output circuit means coupled with said devices in parallel relation for deriving therefrom a control signal responsive to a phase differential between said applied signal.

6. In an electrical system including a first source of signals and a second source of signals, to be compared in phase for control purposes, the signals from said sources being evenly harmonically related in frequency, a circuit for detecting differences in phase between the signals from said two sources comprising in combination, a pair of semiconductor devices of opposite conductivity types having base, emitter and collector electrodes, energizing means connected with said collector electrodes for providing energizing current flow through said devices, means connected for applying signals from said first source to said emitter electrodes, means including a pair of unilaterally conducting devices for applying signals from said second source to said base electrodes, and means connected with said devices in parallel for deriving a control signal responsive to a phase differential between said applied signals and a resultant difference in current flow between said pair of devices.

7. A circuit as defined in claim 6, wherein said energizing means includes gating means for applying pulses for biasing said collector electrodes in a reverse direction relative to said base electrode, whereby said circuit is operative in response to said pulses.

8. A circuit as defined in claim 7, wherein said gating means includes a transformer having a secondary winding connected between said collector electrodes.

9. In an electrical system including a first source of signals and a second source of signals, the signals from said sources being evenly harmonically related in frequency, apparatus for detecting differences in phase between said signals comprising the combination of a pair of transistors of opposite conductivity type each having base, emitter and collector electrodes, energizing means connected with said collector electrodes for applying operating voltages thereto to bias said collector electrodes in a reverse direction relative to their respective base electrodes, means connected for applying signals from said first source to said emitter electrodes, means including a transformer connected for applying signals from said second source directly between said base electrodes and said emitter electrodes, and means connected with said emitter and collector electrodes for deriving a control signal responsive to the difference in current flow between said pair of devices as a measure of the phase differential between said applied signals.

10. In an electrical system including a first source of signals and a second source of signals, apparatus for detecting differences in phase between said signals comprising in combination, a pair of semiconductor devices of opposite conductivity types each having base, emitter and collector electrodes, means connected with said collector electrodes providing energizing current flow through said devices, means connected for applying signals at a predetermined frequency from said first source to said emitter electrodes, means connected for applying signals at an even harmonic frequency of said predetermined frequency from said second source between said base electrodes and said emitter electrodes, and means connected with said system responsive to the difference in current flow between said pair of devices, said last-named means providing a control signal responsive to the difference in phase between said signals.

11. An electrical phase comparison system for comparing the phase of two signals evenly harmonically related in frequency comprising in combination, a pair of transistors of opposite conductivity type each including base, emitter and collector electrodes, said emitter electrodes being connected in common, said base electrodes being connected in common, means connected for applying one of said signals to said emitter electrodes, transformer means connected for applying the other of said signals between said base and emitter electrodes, energizing means connected with said collector electrodes, and output circuit means coupled with said emitter electrodes, said last named means providing a control signal responsive to the difference in phase between said two signals.

References Cited in the file of this patent

UNITED STATES PATENTS

| | | |
|---|---|---|
| 2,582,596 | MacRae | Jan. 15, 1952 |
| 2,617,858 | Brink | Nov. 11, 1952 |
| 2,698,392 | Herman | Dec. 28, 1954 |
| 2,705,287 | Lo | Mar. 29, 1955 |
| 2,744,198 | Raisbeck | May 1, 1956 |
| 2,764,687 | Buchanan et al. | Sept. 25, 1956 |
| 2,770,728 | Herzog | Nov. 13, 1956 |
| 2,783,384 | Bright et al. | Feb. 26, 1957 |
| 2,788,493 | Zawels | Apr. 9, 1957 |
| 2,799,784 | Harris et al. | July 16, 1957 |
| 2,827,611 | Beck | Mar. 18, 1958 |

OTHER REFERENCES

"Symmetrical Properties of Transistors and Their Applications," George Sziklai, RCA Pamphlet (reprinted from Proc. of IRE June 1953, pages 717–724).

"Experiments Illustrate Transistor Applications," Electronics, vol. 26, March 1, 1953, pp. 112–113.

"Principles of Transistor Circuits," Shea, copyright 1953, page 156, para. 7.5.3.